United States Patent [19]
Moorehead

[11] 3,831,376
[45] Aug. 27, 1974

[54] THRUST REVERSER

[75] Inventor: James R. Moorehead, Bellevue, Wash.

[73] Assignees: The Boeing Company, Seattle, Wash.; Aeritalia S.p.A., Napoli, Italy

[22] Filed: Feb. 5, 1973

[21] Appl. No.: 329,770

[52] U.S. Cl................... 60/226 A, 60/230, 60/232, 181/33 HA, 239/265.29, 239/265.37
[51] Int. Cl.............................................. F02k 3/06
[58] Field of Search...... 60/226 A, 226 R, 230, 232; 244/52; 181/33 HA; 239/265.29, 265.37; 415/119; 137/15.1

[56] References Cited
UNITED STATES PATENTS

| | | | |
|---|---|---|---|
| 3,465,524 | 9/1969 | Wilde | 60/226 |
| 3,477,231 | 11/1969 | Paulson | 60/226 R |
| 3,481,427 | 12/1969 | Dobbs | 60/226 R |
| 3,542,152 | 11/1970 | Adamson | 60/226 R |
| 3,570,247 | 3/1971 | Denning | 60/230 |
| 3,600,894 | 8/1971 | McLain | 60/226 A |
| 3,608,314 | 9/1971 | Colley | 60/226 A |

*Primary Examiner*—Clarence R. Gordon
*Attorney, Agent, or Firm*—H. Gus Hartmann; Glenn Orlob

[57] ABSTRACT

A fan air thrust reverser for a high by-pass ratio turbofan aircraft engine wherein the fan air exit duct wall is constructed as a thin wall or single thickness panel to achieve a low boat-tail angle nacelle and the reverser assembly comprises a circumferential series of plug type doors inwardly retractable from the duct wall for forming transverse openings through which the exhaust flow can be directed for thrust reversal, provided that thrust reverser cascade panels, normally stowed upstream of the transverse openings, are translated aft into a position over the transverse openings; and the plug type doors are further actuated to rotate inwardly for flow blockage from their trail or idling position parallel to the fan airstream. Safety features being in first translating the blocker door through a parallelogram linkage arrangement to a fan flow trail position, which, if accidentally happened at high speed, would not reverse thrust without further application of signal and power. Also, at high speed (or any speed where reversing was not desired in flight), the cascades must be positioned over the openings or only lateral thrust would result all around the nacelle. The reverser system is thus armed by first placing the cascades over the door openings during take off and just prior to touchdown-landing.

8 Claims, 6 Drawing Figures

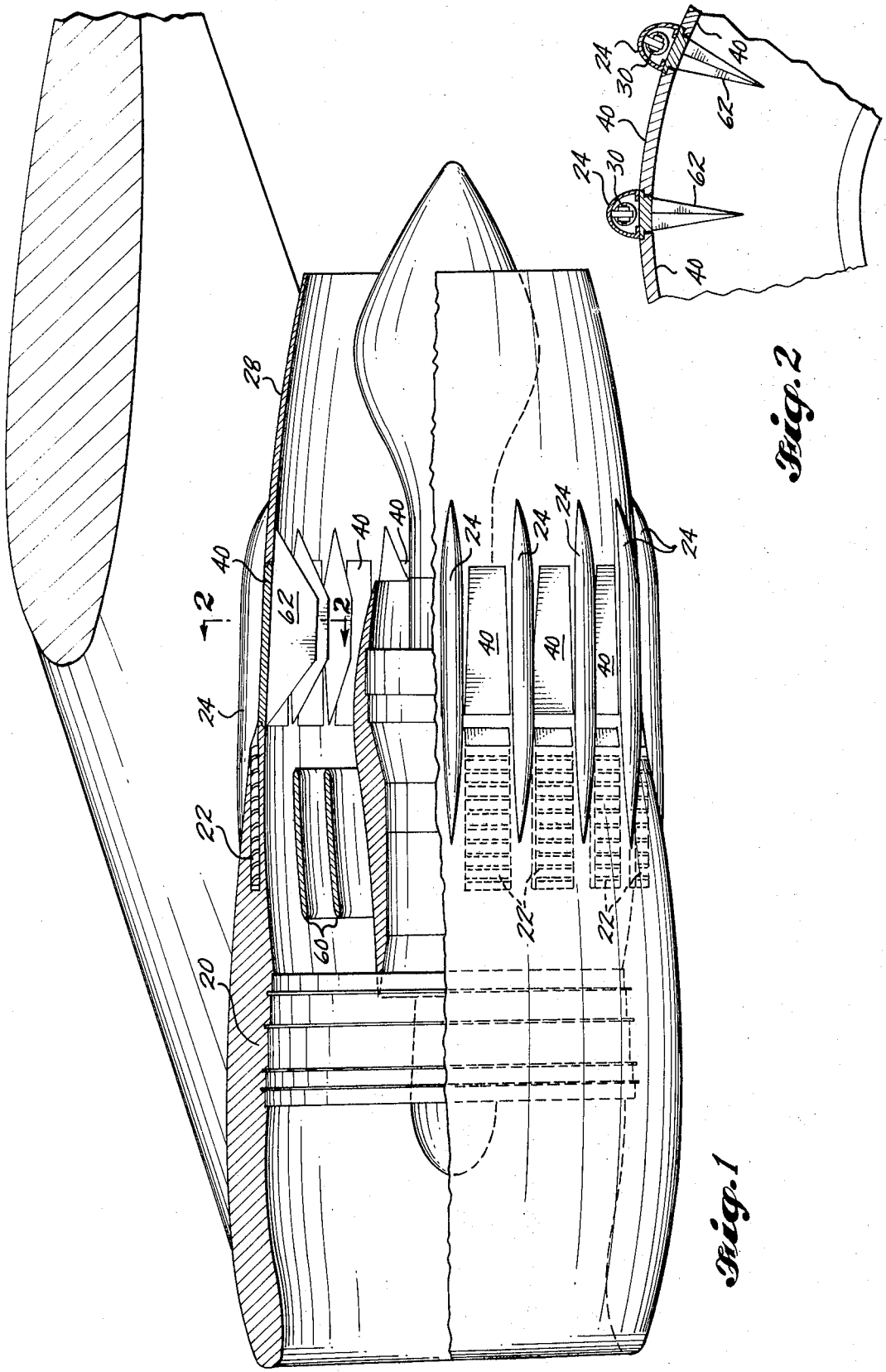

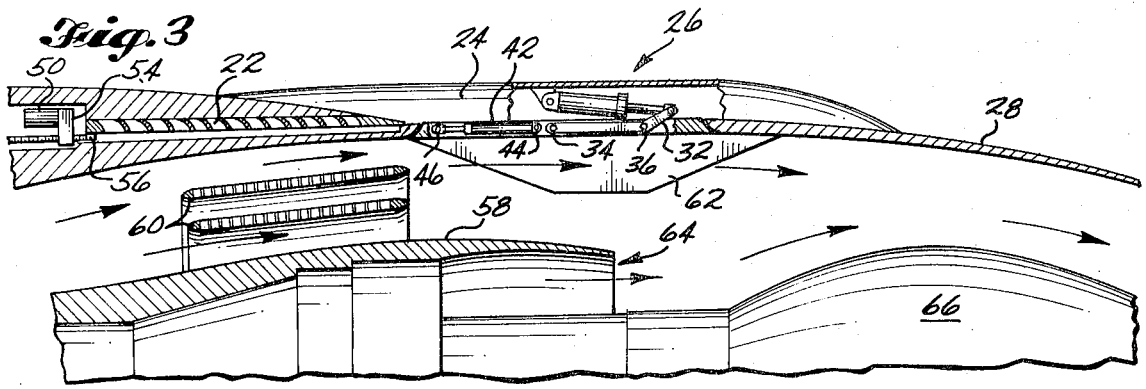
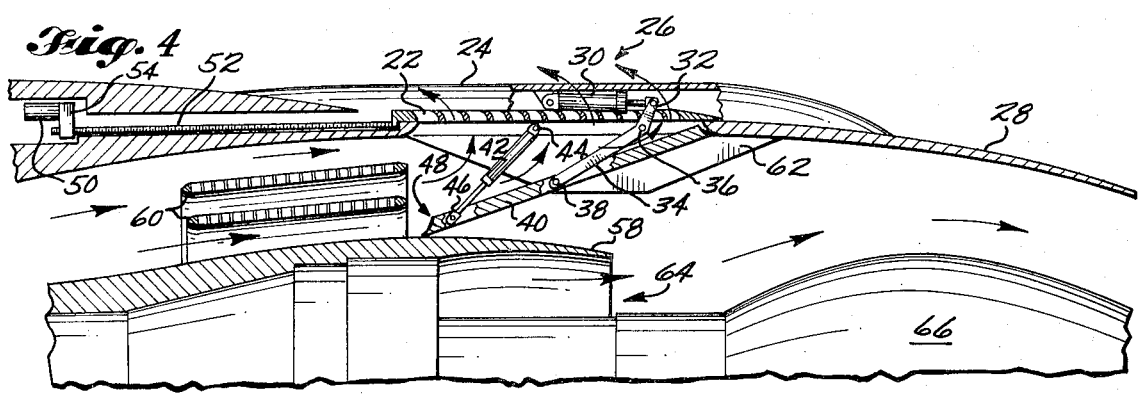
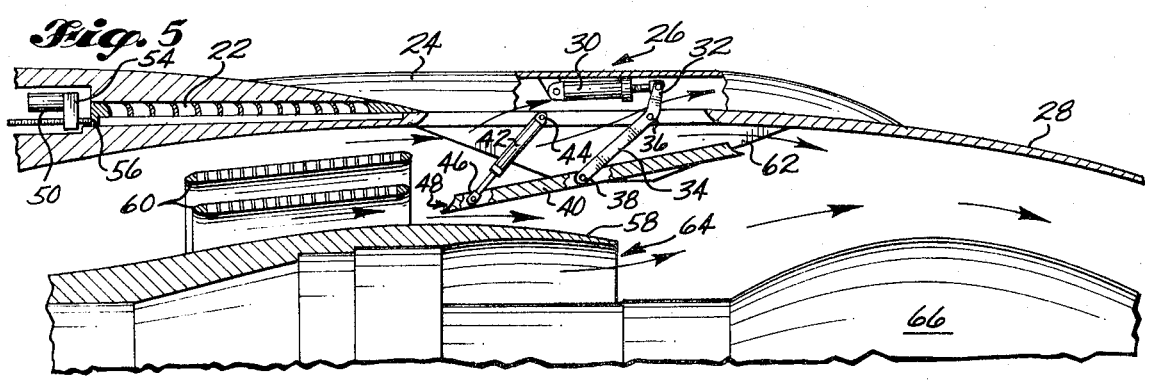
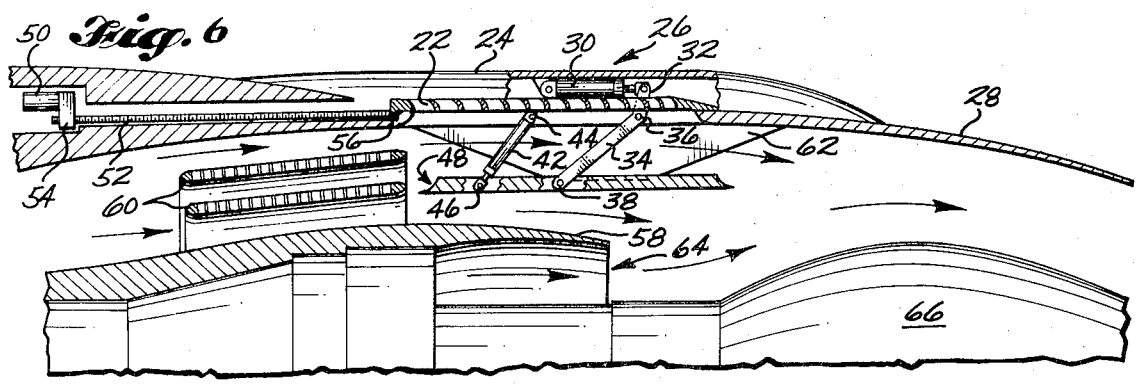

THRUST REVERSER

SUMMARY OF THE INVENTION

The invention relates to a fan air thrust reverser employing a normally closed transverse opening through which the fan air is deflected by a closure door and reversed through a cascade vane panel that is disposed in or near the transverse opening. More particularly, the invention relates to a fan jet duct structure, forming the nacelle cover in the area of the transverse opening, which is constructed as a single unitized thickness panel as with honeycomb and this thin wall structure results in a nacelle having a small exterior boat-tail (cowl) angle and low drag characteristics. The transverse opening in the fan air duct is normally closed by a single thickness internal plug type door which is inwardly displaced through a parallelogram linkage arrangement to an intermediate position where it extends parallel to the fan airstream prior to its being positioned so as to deflect the fan airstream outwardly. Disposed immediately upstream of the transverse opening, in a normally stowed position, is the thrust reverser cascade panel; which is translatable aft into a position bridging the area of the transverse opening for arming the fan air exit duct in the thrust reverse mode. To achieve thrust reversal, the internal plug type door closure panel is further actuated from its intermediate trail position by an extendable link, in the parallelogram linkage arrangement, which rotates the panel so as to extend it diagonally inward with its leading edge into the fan airflow and thereby deflect the airflow radially outward through the transverse opening. Whereupon, the cascade vanes which have been placed into position immediately adjacent the transverse opening, cause the fan airflow to be ejected from the duct in a forward direction and results in tilting the thrust vector forward.

With the blocker doors at their intermediate or trail position, any incremental actuation of the extensible link of the deploying parallelogram linkage mechanism, would result in a rapid responsive thrust modulation which through pilot control, could increase the safety and handling characteristics of the aircraft. Also, due to the rapid actuating response characteristics of the blocker doors between their trail and block positions, this invention would be particularly applicable to carrier landing aircraft which due to the slow spool down speed of the jet engine produce a substantial amount of engine forward thrust that has to be absorbed by the carrier wire and restraining mechanism, and the aircraft hook engaging structure. Further, the rapid actuation of thrust reversal after receiving the cut from the landing signal officer, would be more effective in decreasing forward speed than retarding the throttle lever. The present invention may be particularly advantageous for the carrier landing of larger and heavier multi-engine aircraft, that may exceed the installed retarding or restraining capacity. The rapid attainment of reverse thrust is also vital to decreasing the stopping distance of STOL aircraft, or any aircraft landing in short fields.

The present invention also alleviates the problem associated with airflow distortion on the fan blades when operating in the reverse thrust mode, such as may be caused by reingestion or cross-ingestion of the reversed flow from adjacent engines. The thrust reversing unit should be positioned downstream as far as possible from the fan section in order to reduce flow distortion problems. When present known conventional thrust reversing mechanisms are positioned far enough downstream from the fan section so as not to induce fan distortion, they produce a thick walled nacelle structure because the thrust reverser cover, the cascade vane panel, and the blocker door are generally all stacked at the same station plane. This stacked arrangement produces a high drag due to the large boat-tail angle on the nacelle. Whereas, in the present invention, the elements of the thrust reversing mechanism are arranged in series longitudinally when in their stowed position. The cascade vane panel for flow reversal is stowed in a retracted position within the nacelle wall structure upstream from its operative position adjacent a transverse opening in the nacelle wall. This transverse opening is normally occupied by an internal plug type closure panel which is actually part of the nacelle wall structure. This internal plug panel also serves as the blocker door for thrust reversal. Therefore, this results in a fan air duct wall that is constructed as a single thickness panel and results in a thin wall nacelle structure with a minimum boat-tail angle for producing a low base drag nacelle.

A further disadvantage of the thrust reversing mechanism of these conventional large nacelles which encircle the fan section of a high by-pass-ratio engine, is that they include in addition to the cascade vane panel and blocker door, a relatively large external cover section for the cascade vane panel. This cover section is either translated or hinged as a separate part and this requires additional weight, cost, and maintenance. Also, when connectively linked with the other elements of the reverser mechanism, it could cause the propulsion unit to go into a reverse thrust situation if it were to slide back due to drag or vibration. Fan reversers and particularly the translating cascade reversers wherein the thrust reverser cover, the cascade vane panel, and the blocker door are all connectively linked together, such as on the Boeing 747 and 707 type aircraft, have been known to go into reverse thrust with high power or a series of power changes on the engine because of improper rigging or vibration loosening the connections and causing the parts to slip back and force the blocker door into the gas flow. Whereas, in the present invention, the problem associated with this element is eliminated since there are two primary parts to the thrust reversing mechanism, i.e., a translating cascade vane panel and a deployable blocker door. Safety is provided in that the translating cascade vane panel is not connectively linked with the blocker door and each is individually actuated.

BRIEF DESCRIPTION OF THE DRAWINGS

FIG. 1 is a side elevational view of a high by-pass turbofan engine nacelle showing the exhaust nozzle arrangement and thrust reversing mechanism of the present invention. The upper half of the nacelle is shown in a broken-away sectional view;

FIG. 2 is a cross-sectional end view taken at 2—2 of FIG. 1 and shows the circumferential external lobbed contour of the nacelle and inner wedge shaped seals between the nacelle wall panels;

FIGS. 3 through 6 are enlarged cross-sectional views similar to the upper half cross-sectional view of FIG. 1 but showing the details of the actuating mechanism for deploying the flow deflecting panel in different modes of operation wherein:

FIG. 3 shows the cascade vanes and deflecting panel in their stowed position;

FIG. 4 shows the cascade vanes and deflecting panel in their reverse thrust position;

FIG. 5 shows the cascade vanes in the stowed position with the deflecting panel in a thrust modulating position;

FIG. 6 shows the thrust reversing mechanism in the armed position, i.e., wherein the cascade vanes have been translated aft to a position adjcanet to the transverse opening left by the panel deployed to the trail position whereat it is parallel to the streamwise flow in the duct.

DESCRIPTION OF THE PREFERRED EMBODIMENTS

With respect to the figures, the exterior wall 20 of the engine nacelle, downstream of the stowed cascade vane panel 22, has a circumferential series of longitudinal beams 24 which structurally support a thrust reversing mechanism 26 and a circumferential series of adjustable aft flaps 28 forming a variable outer nozzle section. Structurally connected to the longitudinal beam 24 is a door translation actuator 30 which actuates crank arm 32 integral with lever or link 34 about a fixed pivotal connection 36. The longitudinal beam 24 and the door translation actuator 30 are housed within an external lobbed contour of the nacelle. Link 34 is pivotally connected at 38 to blocker door 40 forward of the mid point thereof in order that the blocker door is pressure loaded to trail. Link 34 forms a parallelogram linkage arrangement with the blocker door rotation actuator link 42 which is connected at one end to fixed pivotal connection 44 and at the other end to the blocker door through pivotal connection 46. A relatively small actuator 42 is required for flipping the blocker door 40 from a trail position into the reverse thrust position because of the parallelogram linkage arrangement. The location of its attachment points to the blocker door 40 are such that only a very light force is required by the extendable link 42 to rapidly flip the door into the blocked or diverted flow position. The little scoop like shape of the leading edge 48 of the plug type panel 40 contributes to the deployment of the panel when it is just cracked open. Also, when it does crack open it immediately picks up fan airflow and simultaneously opens up a hole in the duct wall equivalent to the total area required for fan thrust reversal. In present known reversers where the blocker door is hinged at the rear and flips down at the forward leading edge, a relatively larger actuator would be required in order to eliminate the "Slam-Bang" effect due to a fast reverse and a yet still greater force would be necessary in order to retract the blocker door under any sort of loaded condition, i.e., where any appreciable power is being derived from the engine other than retarding the throttle to the engine idle condition whereat the thrust reversing mechanism is generally actuated. Further, the forces required for utilizing the blocker door panel as a rapid thrust modulation control device, as contemplated in the present invention, would be beyond practical consideration.

Prior to rotating the blocker door 40 from a trail position into the reverse thrust position, the cascade vane panel 22 would be translated aft from its stowed position to a position over the transverse opening. The transverse opening is left in the duct wall by the deployed inner plug type panel or blocker door 40. Translation of the cascade vane panel 22 is accomplished by a motor 50 rotatably driving a ball screw 52 through gear box 54. A nut 56 is fixedly connected to the cascade vane panel 22 and through the rotation of ball screw 52, the nut 56 travels thereon and in so doing, translates the cascade vane panel 22 between its stowed and armed positions.

When the blocker door 40 is rotated by the extensible link actuator 42 from a trail position into the reverse thrust position, the forward scoop edge 48 of the blocker door contacts the outer surface of primary duct wall 58, which encircles the exhaust flow from the jet engine section, and deflects the fan airflow through the transverse opening left by the deployed blocker door 40. The engine exhaust primary hot flow enters into the fan air duct nozzle section behind the blocker door 40 when it is in the blocked or diverted fan airflow position as shown in FIG. 4. By dumping the primary flow solely into this large volume behind the blocker door 40 when it is in the blocked position, the forward thrust due to engine primary flow is effectively reduced. Since, the primary flow expands into this large volume and its velocity decreases to the point where reversing of primary flow is not required. On the large high by-pass turbofan engine approximately 70 to 80 percent of the thrust is provided by the fan airflow. Therefore, if this is efficiently reversed and the 20 to 30 percent of the thrust that exhausts from the primary nozzle is effectively reduced by rapid expansion into the fan duct, it still would be possible to meet the general requirement of obtaining 40 percent reverse thrust on the airplane without having to physically reverse the total exhaust flow.

For sound suppression, the accoustic rings 60 are positioned in the by-pass fan air duct upstream of the blocker door 40 and as close to the fan as possible to absorb the noise close to its source. The acoustic material so placed is effective in reducing fan noise during all operating conditions. Also, these acoustic rings 60, when utilized in combination with dumping the engine primary flow into the large nozzle volume aft of the blocker door 38, as shown in FIG. 4, provides an effective sound suppression when the engine is operated in the reverse thrust mode.

FIG. 2 is a sectional end view taken at 2—2 of FIG. 1 and shows the lobbed arrangement with a wedge shape seal 62 positioned between the blocker doors 40 for their side edges to slide on. The seals 62 protrude into the fan airflow but have little affect on its flow characteristics since the flow velocity is probably only about four-tenths Mach number and therefore the seal contributes practically no loss to the fan airflow inside the duct.

The thrust reversing mechanism of the present invention is shown in a preferred embodiment of a variable area mixed flow exhaust nozzle for a high by-pass ratio turbofan engine wherein the blocker door is rotated inward from its leading edge such that it contacts or blocks down to the primary flow duct or in some cases down to a large center plug which is generally installed within the large turbofan engines to decrease the high boat-tail angle that would otherwise result in high drag characteristics. In the turbofan nozzle arrangement shown, the jet engine flow exhausts from the primary nozzle 64 and enters a large volume chamber, behind the blocker door 40 when in its blocked position, where it mixes with the fan airflow and the combined flow is then subjected to flow control by a translating plug 66 operating in combination with an adjustable aft flap 28 forming the trailing edge section of fan nacelle. The turbofan nozzle thus formed at the terminus of the nacelle provides a more effective control over the total thrust flow of a turbofan engine than the present known configuration wherein the fan flow exits from a short shroud substantially upstream from the nozzle exit of the primary engine flow and generally both the fan nozzle and the primary nozzle are of a fixed area configuration.

One of the advantages of the present invention is that if the reverser is not armed in the reverse thrust mode by aft translation of the cascade vane panel, it can not go into reverse thrust. Since there is no interconnecting linkage between the cascade vanes and the blocker door, any linkage failure or movement of the blocker door to the blocked position due to vibration would not put the engine into the reverse thrust position. Further, since the cascade vane panel is stowed within the exterior wall of the turbofan nacelle the airstream flow would not be able to drag the cascades mounted on a ball screw drive mechanism all the way out, somewhere around three feet, to its armed position. Further, if the blocker door were to vibrate loose and somehow come down to the blocked position without the cascades being armed, the fan thrust would be diverted outward within 30° of axial thrust but there would still be a sufficient forward thrust vector to safely fly the airplane.

One of the problems associated with the present known high by-pass fan airflow reversing systems is that as the blocker door starts to toe in to block the flow, insufficient flow exit area can exist and in most instances, the rate of increase of exhaust area does not match the deflected flow rate increase as the blocker door enters into the fan airflow stream, i.e., the volume of flow reversed does not match the volume of fan airflow deflected and acts to restrict flow and surge the engine. Due to losses in turning the airflow, the rate of opening up the transverse flow exit area has to be as fast or faster than the rate of increase in the volume of airflow deflected. Therefore, an advantage of the present invention is that the entire transverse fan airflow exit area is open before there is substantially any deflection of the fan airflow for thrust reversal and as a result there is no pressure feedback through the duct which would cause flow distortion on the fan. The instant that the plug-type panel or blocker door of the present invention is cracked open and deployed laterally and parallel to the duct airflow by the parallelogram linkage arrangement, it opens up an enormous hole in the nacelle wall.

The angle of the doors in blocking position provides increased efficiency of flow turning in reverse mode. Whereas, with present day blocker doors positioned with the inward edge aft of the outer edge, turning losses are increased because the gas flow has to form its own path to reach the cascades and results in lost energy.

While the invention has been disclosed with reference to a preferred embodiment, it is to be understood that those modifications and changes which become obvious to a person skilled in the art as a result of the teachings hereof, will be encompassed by the following claims:

What is claimed is:

1. In combination with a jet engine fluid flow duct, a forward thrust flow modulating apparatus for a jet engine comprising: a panel forming an inner plug-type panel of the duct wall and being retained in pressure sealing engagement by differential pressure between the engine thrust fluid flow within the duct and the external atmospheric pressure on the outside of the duct wall; linkage means for deploying the panel inwardly from the wall of the duct to an intermediate position within the duct so as to aerodynamically trail the panel in the engine thrust fluid flow; said panel exposing a transverse opening in the duct wall when deployed to the intermediate position; actuator means for positioning the panel from the intermediate trail position to a position so as to deflect the fluid flow to exit through the transverse opening; whereby the forward thrust flow is modulated by diverting the flow outwardly and thus decreasing the forward thrust vector of the jet engine.

2. The apparatus as set forth in claim 1, wherein said linkage means comprises a parallelogram linkage arrangement for lateral displacement of the panel inwardly from the wall of the duct and parallel to the fluid flow within the duct when deployed to the intermediate position.

3. The apparatus as set forth in claim 1, wherein said panel has a scoop like leading edge which immediately picks up fluid flow within the duct as it is cracked open for displacement inwardly and simultaneously opens up a passageway through the wall of the duct which has a cross-sectional flow area substantially equivalent to the area of fluid flow picked up by the protruding scoop.

4. In combination with a high by-pass ratio turbofan engine, a fan thrust airflow modulating apparatus comprising: a duct for the fan thrust airflow; a panel forming an inner plug-type panel of the duct wall; linkage means for deploying the panel inwardly from the wall of the duct to an intermediate position within the duct so as to aerodynamically trail the panel in the fan thrust airflow; said panel exposing a transverse opening in the duct wall when deployed to the intermediate position; actuator means for positioning the panel from the intermediate trail position to a position so as to deflect the fan airflow outwardly through the transverse opening whereby the fan thrust airflow is modulated by diverting the flow outwardly and thus decreasing the magnitude of the forward thrust vector.

5. The apparatus as set forth in claim 4, wherein said linkage means comprises a parallelogram linkage arrangement for lateral displacement of the panel inwardly from the wall of the duct and parallel to the fluid flow within the duct when deployed to the intermediate position.

6. The apparatus as set forth in claim 4, wherein said panel has a scoop like leading edge which immediately picks up fluid flow within the duct as it is cracked open for displacement inwardly and simultaneously opens up a passageway through the wall of the duct which has a cross-sectional flow area substantially equivalent to the area of fluid flow picked up by the protruding scoop.

7. A fan airflow thrust reversing apparatus for a high by-pass ratio turbofan engine, comprising: a duct for the fan thrust airflow; a panel forming an inner plug-type closure in the duct wall; linkage means for deploying the panel inwardly from the wall of the duct to an intermediate position within the duct so as to aerodynamically trail the panel in the fan thrust airflow; said panel exposing a transverse opening in the duct wall when deployed to said intermediate position; vane elements stowed in the duct wall upstream of the transverse opening for turning the flow directed therethrough to produce a forwardly inclined thrust vector; means for translating the vane elements from their stowed position to an extended position adjacent to the transverse opening; means for positioning the panel from the intermediate trail position to a position so as to deflect the fan airflow outwardly through both the transverse opening and the vane elements whereby the fan thrust airflow is reversed.

8. In combination with a high by-pass ratio turbofan engine, a sound suppressor and fan airflow thrust reversing apparatus, comprising: a primary duct for the engine turbine exhaust flow; a secondary duct in laterally spaced relation to the primary duct and having a greater cross-sectional flow area for the fan thrust airflow; a panel forming an inner plug-type closure in the secondary duct wall between the fan airflow within the secondary duct and the external atmospheric pressure on the outside of the secondary duct wall; linkage means for deploying the panel inwardly from the wall of the secondary duct to an intermediate position within the secondary duct so as to aerodynamically trail the panel in the fan thrust airflow; said panel exposing a transverse opening in the secondary duct wall when deployed to said intermediate position; vane elements stowed in the secondary duct wall upstream of the transverse opening for turning the flow directed therethrough to produce a forwardly inclined thrust vector; means for translating the vane elements from their stowed position to an extended position adjacent to the transverse opening; means for positioning the panel from the intermediate trail position to a position so as to deflect the fan airflow outwardly through both the transverse opening and the vane elements for reversing the fan thrust airflow; acoustic panels positioned within the secondary duct downstream of the fan blade section and upstream of the panel for attenuating the noise emitted by the fan blading; said primary duct turbine exhaust flow being merged into the larger volume of the secondary duct at a position downstream of the panel when it is in the deflected fan airflow position; whereby the forward thrust due to the engine primary flow is effectively decreased by the rapid expansion of the primary flow in the larger volume and the subsequently reduced velocity attenuates the noise emitted by the engine turbine section.

* * * * *